(12) United States Patent
Chacon et al.

(10) Patent No.: US 11,453,579 B2
(45) Date of Patent: Sep. 27, 2022

(54) HOISTING MANAGEMENT SYSTEM FOR CLOSED ENVIRONMENTAL FACILITIES

(71) Applicant: Wideband Labs, LLC, Joplin, MO (US)

(72) Inventors: Ryan Edward Chacon, Carthage, MO (US); Jason Turner, Joplin, MO (US); Joshua Amos Carrier, Carl Junction, MO (US); Jared Lynn Wilkinson, Carthage, MO (US)

(73) Assignee: Wideband Labs, LLC, Joplin, MO (US)

( * ) Notice: Subject to any disclaimer, the term of this patent is extended or adjusted under 35 U.S.C. 154(b) by 180 days.

(21) Appl. No.: 16/983,426

(22) Filed: Aug. 3, 2020

(65) Prior Publication Data
US 2021/0032082 A1 Feb. 4, 2021

Related U.S. Application Data

(60) Provisional application No. 62/882,191, filed on Aug. 2, 2019.

(51) Int. Cl.
*B66D 1/48* (2006.01)
*B66D 1/26* (2006.01)
*G06F 16/901* (2019.01)
*B66D 1/38* (2006.01)

(52) U.S. Cl.
CPC .............. *B66D 1/485* (2013.01); *B66D 1/38* (2013.01); *G06F 16/901* (2019.01)

(58) Field of Classification Search
CPC ... B66D 1/26; B66D 1/38; B66D 1/46; B66D 1/485; F21V 21/38; B65H 19/126; G06F 16/901; A01G 9/20
See application file for complete search history.

(56) References Cited

U.S. PATENT DOCUMENTS

| | | | | |
|---|---|---|---|---|
| 2,020,306 A | * | 11/1935 | Fitch | B66C 1/101 294/81.3 |
| 2,213,766 A | * | 9/1940 | Johnson | B62B 3/0625 254/279 |
| 2,626,375 A | * | 1/1953 | Fischer | H02P 7/26 318/67 |
| 4,392,187 A | * | 7/1983 | Bornhorst | F21S 10/02 362/233 |

(Continued)

FOREIGN PATENT DOCUMENTS

| | | |
|---|---|---|
| KR | 200364503 Y1 * | 10/2004 |
| KR | 20170010654 A * | 2/2017 |

*Primary Examiner* — Michael E Gallion
(74) *Attorney, Agent, or Firm* — Avek IP, LLC; Mark C. Young (57) ABSTRACT

A management system for a closed environmental facility includes one or more motorized tubular hoist mechanisms operable to adjust the height of environmental modules above one or more groups of plants. A central controller provides signals over a wireless communication network to command the hoist mechanisms to move the environmental modules to a desired position. In further embodiments, environmental sensors provide data to the central controller and the controller automatically calculates desired positions of the environmental modules based on the data and commands the hoist mechanisms to achieve the desired positioning.

11 Claims, 9 Drawing Sheets

(56) References Cited

U.S. PATENT DOCUMENTS

| | | | | |
|---|---|---|---|---|
| 4,662,628 A * | 5/1987 | Chatenay epouse Compagnone | A63J 1/028 254/278 |
| 4,851,980 A * | 7/1989 | McWilliams | F21V 21/38 362/403 |
| 6,957,804 B2 * | 10/2005 | Heggestad | B66D 1/04 254/278 |
| 6,969,049 B2 * | 11/2005 | Bilcik | A01M 31/006 254/278 |
| 7,153,001 B2 * | 12/2006 | Kim | F21V 21/38 362/291 |
| 7,243,870 B2 * | 7/2007 | Pook | A63J 1/028 242/278 |
| 8,215,618 B2 * | 7/2012 | Kochan | B66D 1/14 254/266 |
| 8,348,215 B1 * | 1/2013 | Smith | F04D 29/601 248/329 |
| 9,758,340 B1 * | 9/2017 | Reese | B65H 54/026 |
| 9,815,670 B2 * | 11/2017 | Bauder | F21V 27/00 |
| 2013/0112930 A1 * | 5/2013 | Davis | B66D 1/26 254/264 |
| 2013/0238135 A1 * | 9/2013 | Fisher | F16M 11/425 700/275 |
| 2016/0113213 A1 * | 4/2016 | Berinsky | H05B 45/20 47/58.1 LS |
| 2019/0195478 A1 * | 6/2019 | Hayrapetian | B66D 1/12 |
| 2021/0100176 A1 * | 4/2021 | Loera | B66D 1/12 |

\* cited by examiner

HOISTING MANAGEMENT SYSTEM FOR CLOSED ENVIRONMENTAL FACILITIES

CROSS-REFERENCE TO RELATED APPLICATIONS

This application claims the benefit of U.S. Provisional Patent Application No. 62/882,191, filed Aug. 2, 2019, the disclosure of which is hereby incorporated herein in its entirety by reference.

BACKGROUND

Closed or indoor environmental facilities for growing plants offer many advantages over outdoor growing. For example, a closed environmental facility allows direct control of the light, water, and nutrition received by the plants growing within. A typical closed environmental facility for growing plants indoors includes fixed overhead lighting, with controllable water and nutrition distribution systems distributed throughout the growing area.

While such known indoor systems are useful, they rarely provide optimal conditions for growing specific plants, and do not necessarily allow adjustment or measurement of important environmental parameters.

For example, a fixed lighting source mounted on the ceiling of a facility may not provide light at an intensity and wavelength that is ideal for growing and maintaining any specific plant Furthermore, simply increasing the intensity of the light generally increases the power consumption and increases the cost of operating the facility. And, the lighting and nutritional needs of specific plants often vary as they age and proceed through their growing cycles, thus fixed indoor systems do not provide an optimum environment for growing plants indoors.

Thus, it can be seen that there remains a need in the art for systems that allow for varying lighting and other environmental parameters to provide better optimized growing of indoor plants.

SUMMARY

Embodiments of the invention are defined by the claims below, not this summary. A high-level overview of various aspects of the invention is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes, among other things, a management system for closed environmental facilities.

The present invention is directed to systems and methods for collecting, managing, and distributing data to automate environmental parameters and to coordinate motion control for optoelectronic modules used in closed environmental facilities such as greenhouses and the like.

In one aspect, the system and method of the present invention monitors and collects environmental data within the environmental facility and stores the collected data in a networked or cloud-based database.

In another aspect, the system and method of the present invention performs analytics on the collected data to determine and compare actual parameters to optimal values, and to provide adjustments to one or more environmental systems within the facility based on that analysis.

In further aspect, the system of the present invention is modular, with additional segments of tubular shaft connectable by a coupler to allow extending the shaft to any desired length.

In yet another aspect, the system and method of the present invention controls the movement of lighting and other environmental modules within the facility to achieve a desired output or environment. In an exemplary embodiment, a plurality of tubular motors are controlled, with the rotational motion of the motors translated into horizontal and/or vertical linear movement of one or more modules, such as lighting and plantae maintenance systems.

In further embodiments, the tubular motors may include a wireless repeater system to allow propagation of communications between the motors and with controllers without requiring external wiring.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Embodiments of the invention include motorized tubular hoist mechanisms for raising, lowering, and positioning horizontally a plurality of lighting modules and/or other environmental control or measurement modules in a closed environmental facility. Power to the lighting modules or other environmental control or measurement modules is provided through a coiled power cord that extends and retracts as the module is raised and lowered. Communication to the modules is preferably provided via a wireless connection to a control computer, in alternative embodiments communication may be accomplished through hard wired connections, such as an Ethernet cable.

Figure 1:
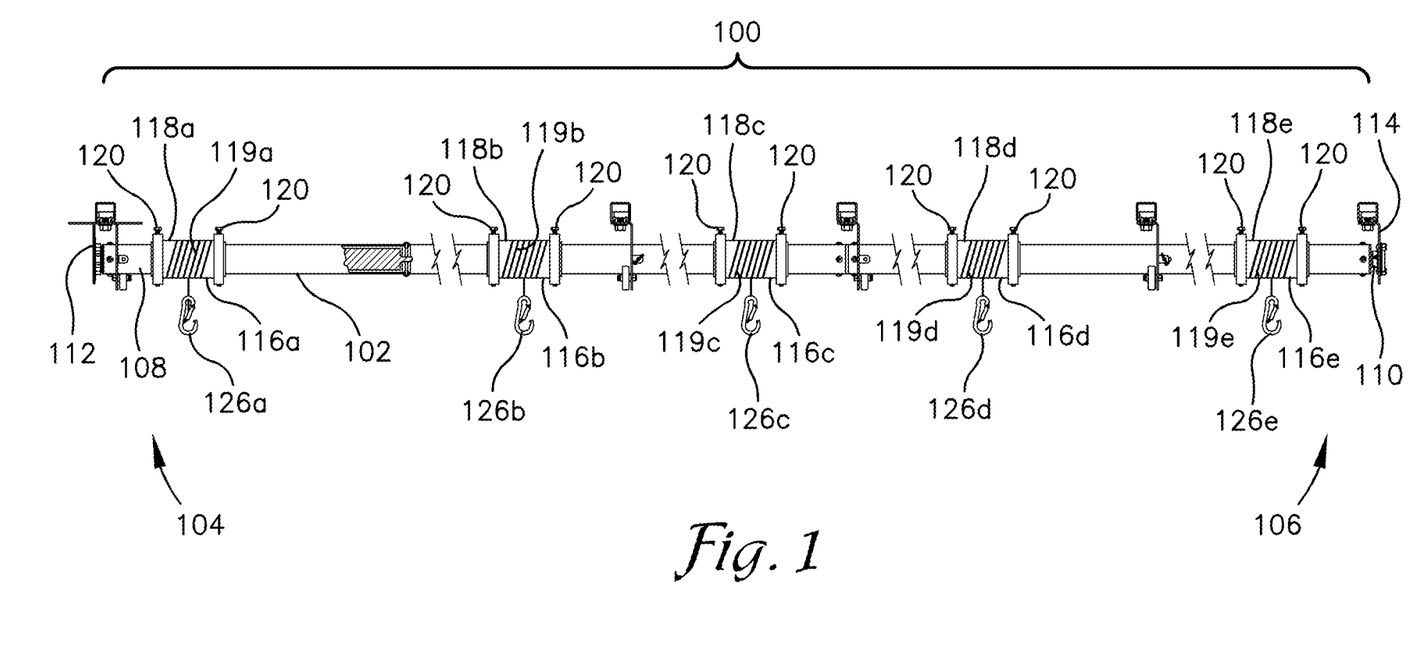
FIG. 1 is a plan view of a motorized tubular hoist mechanism for controlling the position of a plurality of lighting modules in accordance with an exemplary embodiment of the present invention.

Looking first to FIG. 1, a motorized tubular hoist mechanism in accordance with a first exemplary embodiment of the present invention is designated generally by the numeral 100. The tubular hoist mechanism generally comprises a tubular shaft 102 extending between first and second ends 104, 106, with a motor 108 coupled to the first end 104 of the shaft 102 and an idler mechanism 110 coupled to the second end 106 of the shaft. A motor bracket 112 attaches to the motor 108 and provides for attachment to a support strut (not shown) that attaches to a structural component of a facility. An idler bracket 114 similarly attaches to the idler mechanism 110 and similarly allows for attachment to a support strut (not shown).

With the motor 108 and idler mechanism 110 coupled to the tubular shaft 102 as described, rotation of the motor 108 will impart rotation to the shaft 102 and to the idler mechanism, i.e., rotation of the motor 108 causes rotation of the tubular shaft 102.

A plurality cable drums 116a, 116b, 116c, 116d, 116e are positioned along the length of tubular shaft 102. Each cable drum comprises a hollow cylindrical main body 118a, 118b, 118c, 118d, 118e, with a raised shoulder at each end of the main body. The interior diameter of the hollow main body of each cable drum 116 is sized slightly larger than the outer diameter of the tubular shaft 120 so that the cable drum can slide along the shaft 102 to allow a desired horizontal positioning of the drum. Locking bolts 120 extend through the shoulder at each end of each drum so that the corresponding cable drum can be locked into a desired position along the tubular shaft 102 by tightening the locking bolts to frictionally engage with the tubular shaft.

A plurality of intermediate support brackets 122a, 122b, 122c are spaced along the tubular shaft 102. Each intermediate support bracket is configured to attach to a support strut (not shown) to further support the tubular main body portion 118a in manner similar to that of the motor bracket 112 and idler bracket 114 as previously described. As will be seen and described with respect to subsequent figures, each intermediate support bracket 122 includes a pair of support rollers to allow the tubular shaft 102 to easily turn within the support bracket.

With the motor bracket 112, idler bracket 114, and intermediate support brackets 122a, 122b, 122c attached to a support strut which is attached to, for example, ceiling joists or trusses of an indoor environmental facility, the tubular shaft 102, motor 108 and idler mechanism 110 are suspended in the facility such that rotation of the motor 108 rotates the tubular shaft 102 and the attached cable drums 116a, 116b, 116c, 116d, 116e.

Looking still to FIG. 1, each cable drum 116a, 116b, 116c, 116d, 116e includes a corresponding cable 124a, 124b, 124c, 124d, 124e wound around the main body portion of the drum. An attachment hook 126a, 126b, 126c, 126d, 126de is attached at the end of each corresponding cable to allow attachment to a lighting module or other environmental module.

Thus, looking still to FIG. 1, it should be apparent that rotating the tubular shaft 102 rotates the cable drums 116a, 116b, 116c, 116d, 116e, which winds, or unwinds, the corresponding cables 124 to or from the main body portion of the drum. It can be seen that, with the attachment hooks 126 attached to a lighting module or other environmental module, that rotating the motor 108 will raise or lower the attached modules in unison.

With the overall structure of the motorized tubular hoist mechanism 100 set forth, FIGS. 2 through 6 provide close-up detailed views of the structure as just described.

Figure 2:
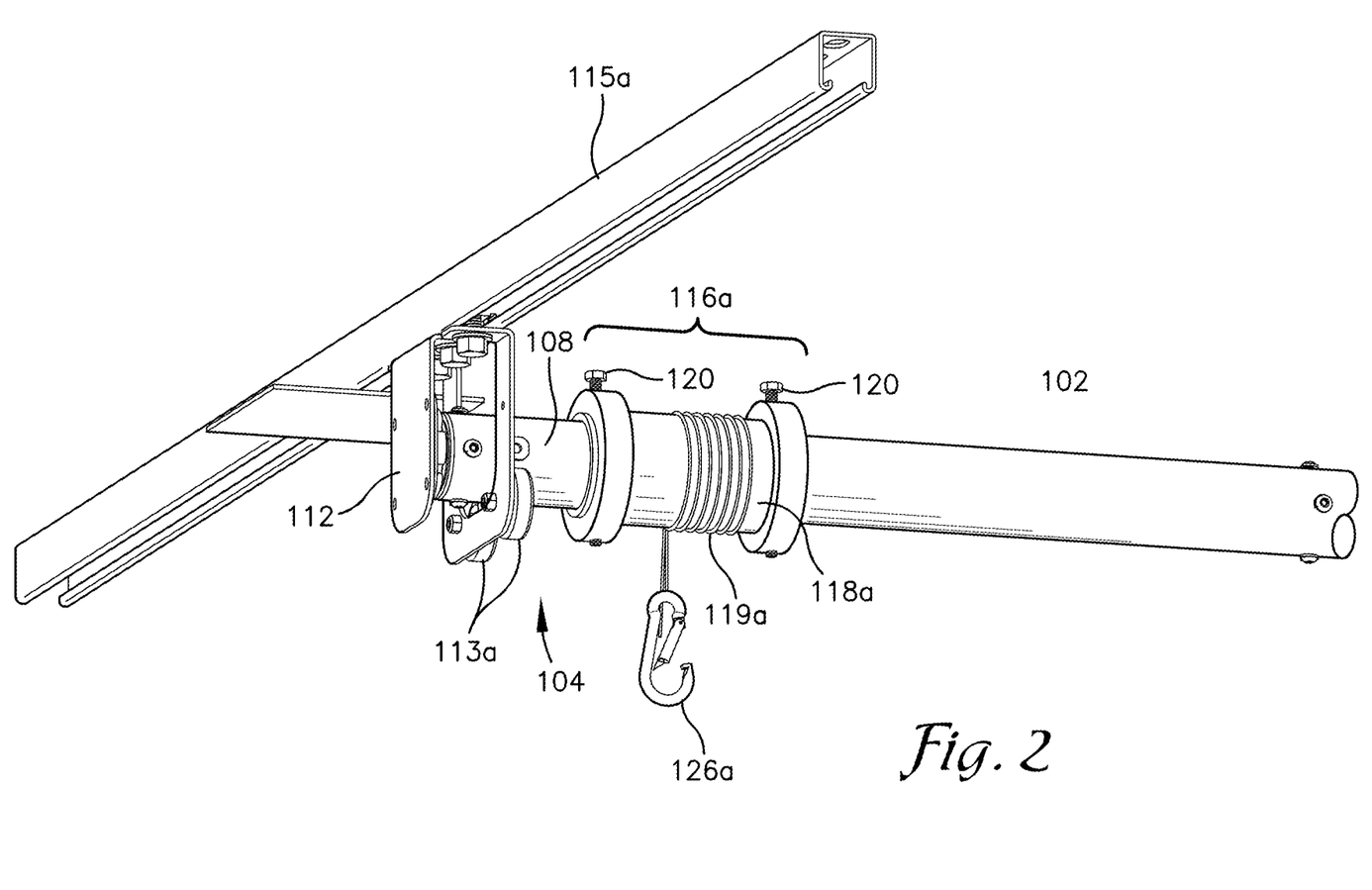
FIG. 2 is close-up partial perspective view of the motor-end portion of the motorized tubular hoist mechanism of FIG. 1.

Turning to FIG. 2, the motorized end of the motorized tubular hoist mechanism is depicted. Motor 108 is attached to the first end 104 of the tubular shaft 102. The motor bracket 112 is attached to the motor 108 and is further attached to a support strut 115a that can be attached to a structural component of the indoor environmental facility. Two idler wheels 113a, 113b support the outer rotor of the motor 108, allowing it to turn in conjunction with the tubular shaft 102. Cable drum 116a is positioned on the tubular shaft 102, with lock bolts 120 securing the drum to the shaft. Cable 119a is wound around the drum, with attachment hook 126a attached at the end of the cable.

Thus, with the motor end of the motorized tubular hoist mechanism 100 supported by the motor bracket 112 attached to a support strut 115a, rotation of the motor 108 rotates the tubular shaft 102, which in turn rotates the cable drum 116a, causing cable 119a to wind onto, or unwind from, the drum. With the attachment hook 126a attached to a light module or other environmental module, it can be seen that rotating the motor 108 will raise or lower that module via the cable 119a winding or unwinding from the drum 116a.

Figure 3:
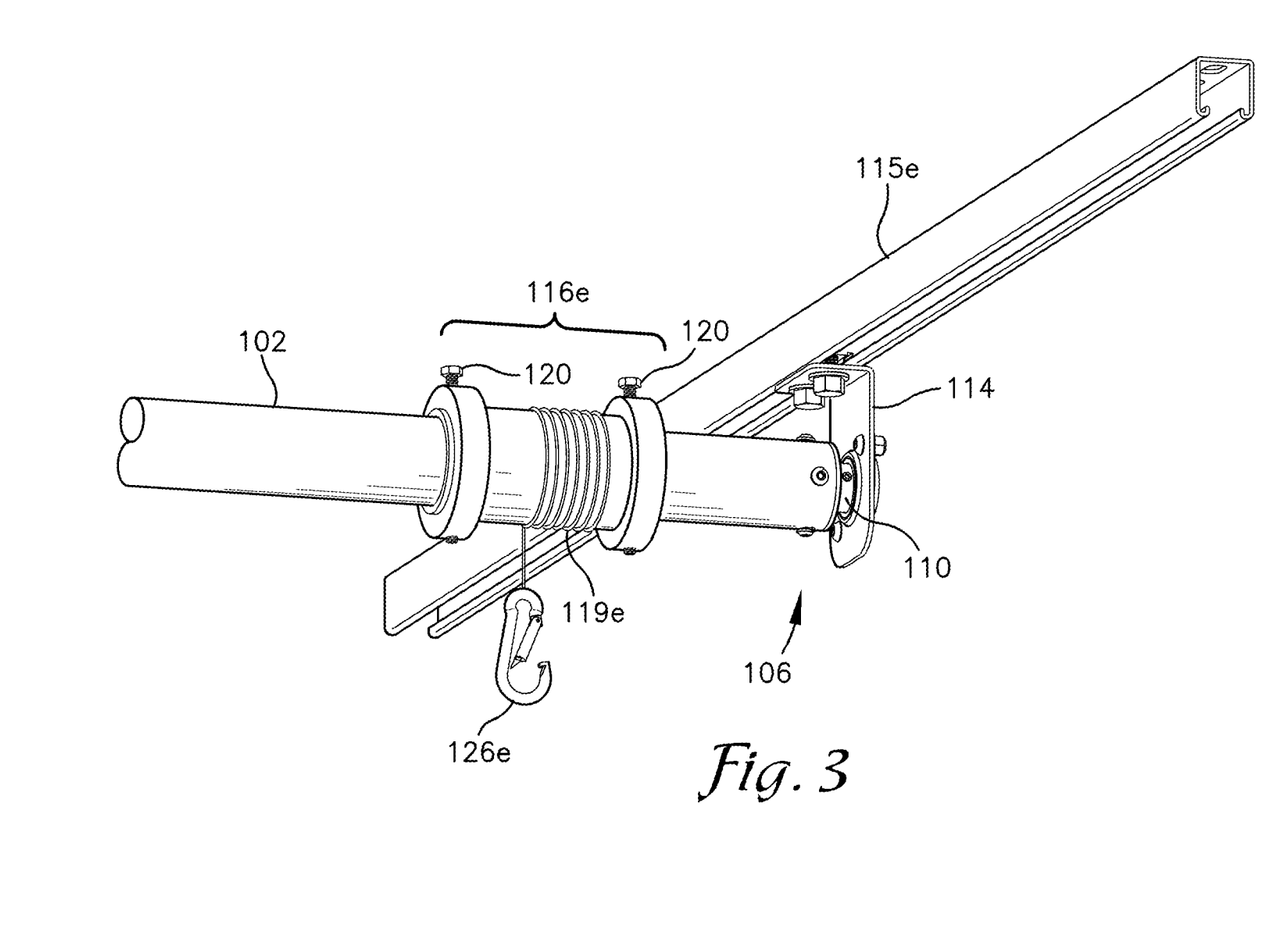
FIG. 3 is a close-up partial perspective view of the idler-end portion of the motorized tubular hoist mechanism of FIG. 1.

Looking to FIG. 3, the idler mechanism end of the motorized tubular hoist mechanism is depicted. Idler mechanism 110 is attached to the second end of the tubular shaft 102. The idler bracket 114 is attached to the idler mechanism and is further attached to a support strut 115e that can be attached to structural component of the indoor environmental facility. The idler mechanism 110 supports the tubular shaft 102 and allows it to rotate while supported. Cable drum 116e is positioned on the tubular shaft 102, with lock bolts 120 securing the drum to the shaft. Cable 119e is wound around the drum, with attachment hook 126e attached at the end of the cable.

Thus, with the idler end of the motorized tubular hoist mechanism 100 supported by the idler bracket 114 attached to a support strut 115e, rotation of the motor 108 rotates the tubular shaft 102, which in turn rotates the cable drum 116e, causing cable 119e to wind onto, or unwind from, the drum. With the attachment hook 126e attached to a light module or other environmental module, it can be seen that rotating the motor 108 will raise or lower that module via the cable 119e winding or unwinding from the drum 116e.

Figure 4:
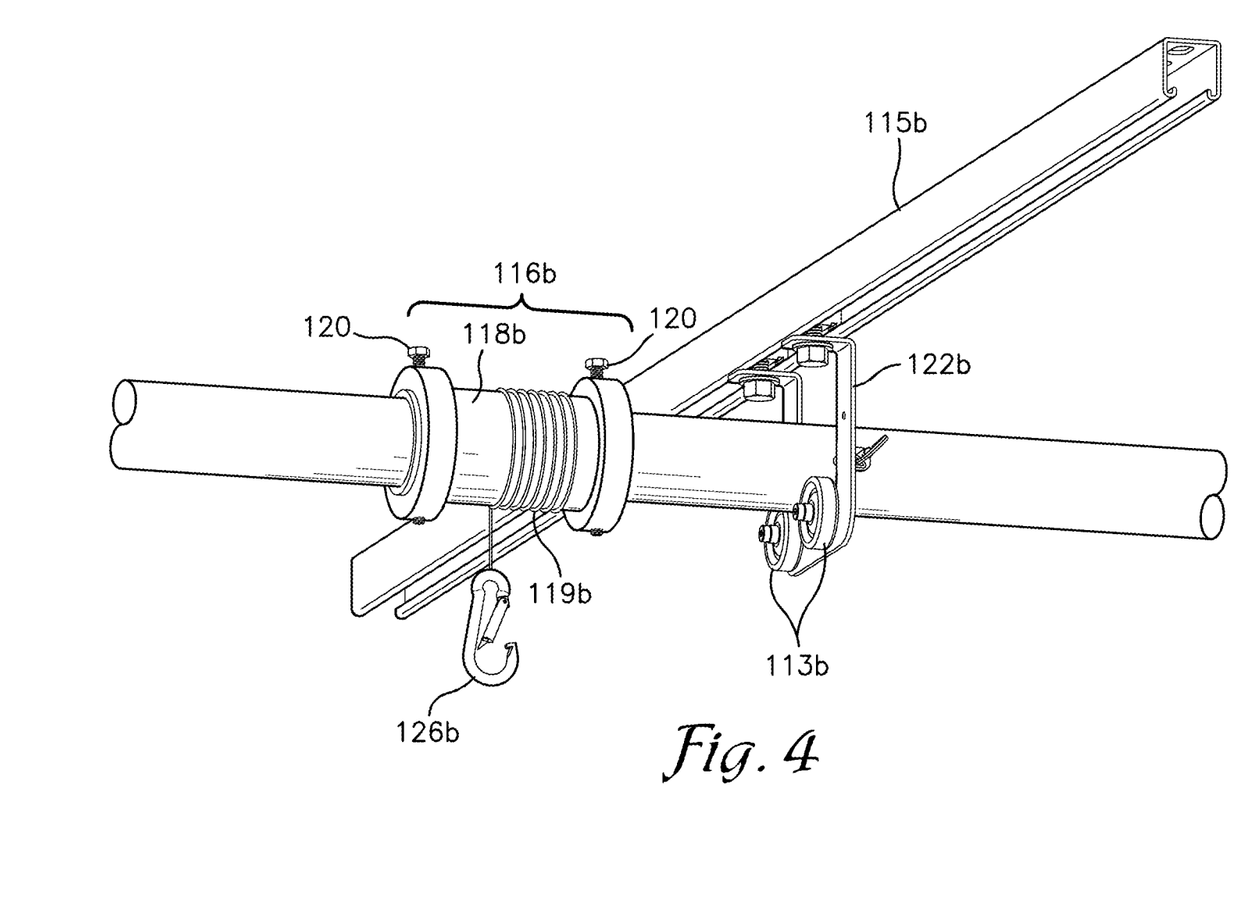
FIG. 4 is a close-up partial perspective view of a first inner portion of the motorized tubular hoist mechanism of FIG. 1.
Figure 5:
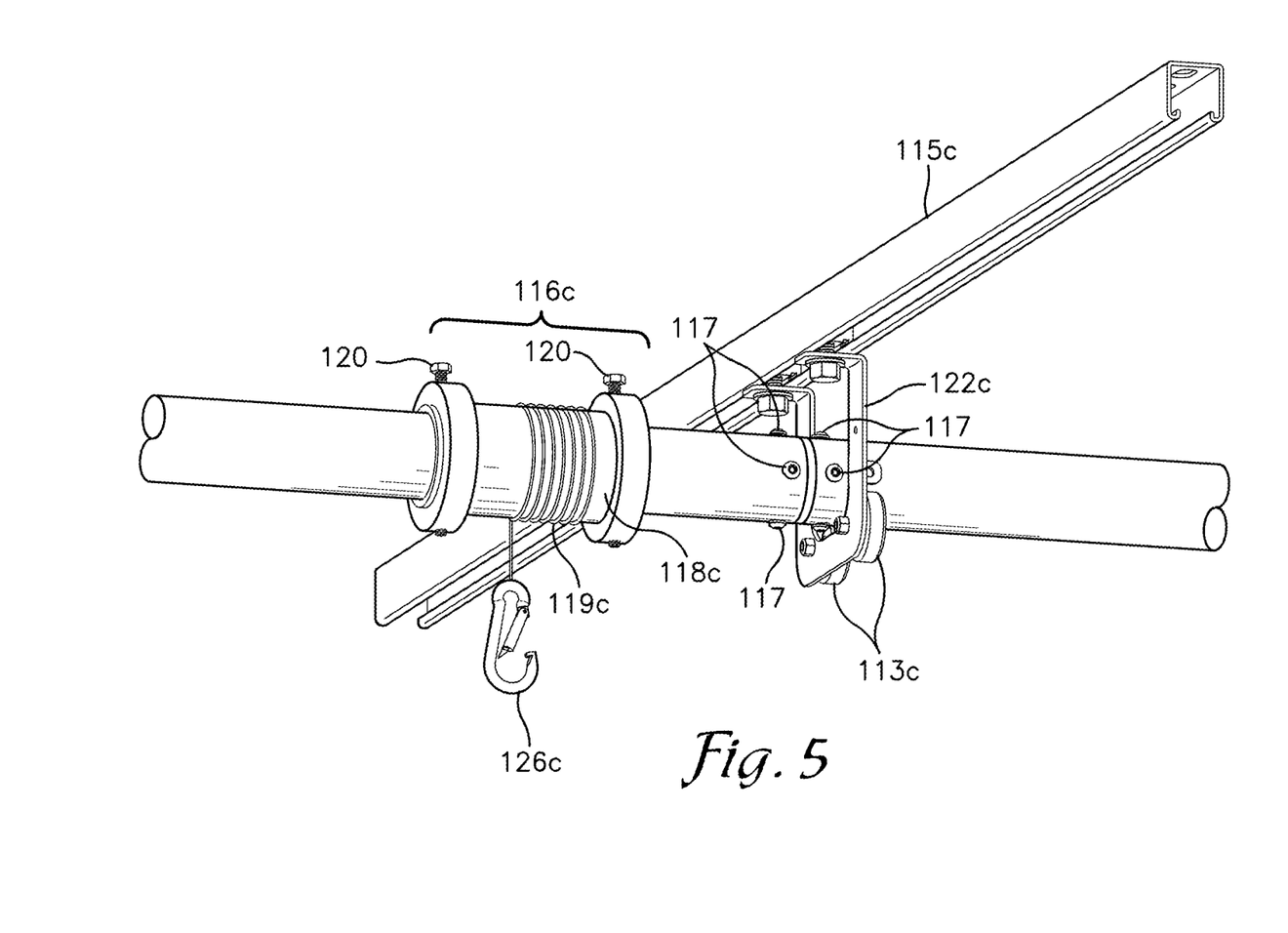
FIG. 5 is a close-up partial perspective view of a second inner portion of the motorized tubular hoist mechanism of FIG. 1.
Figure 6:
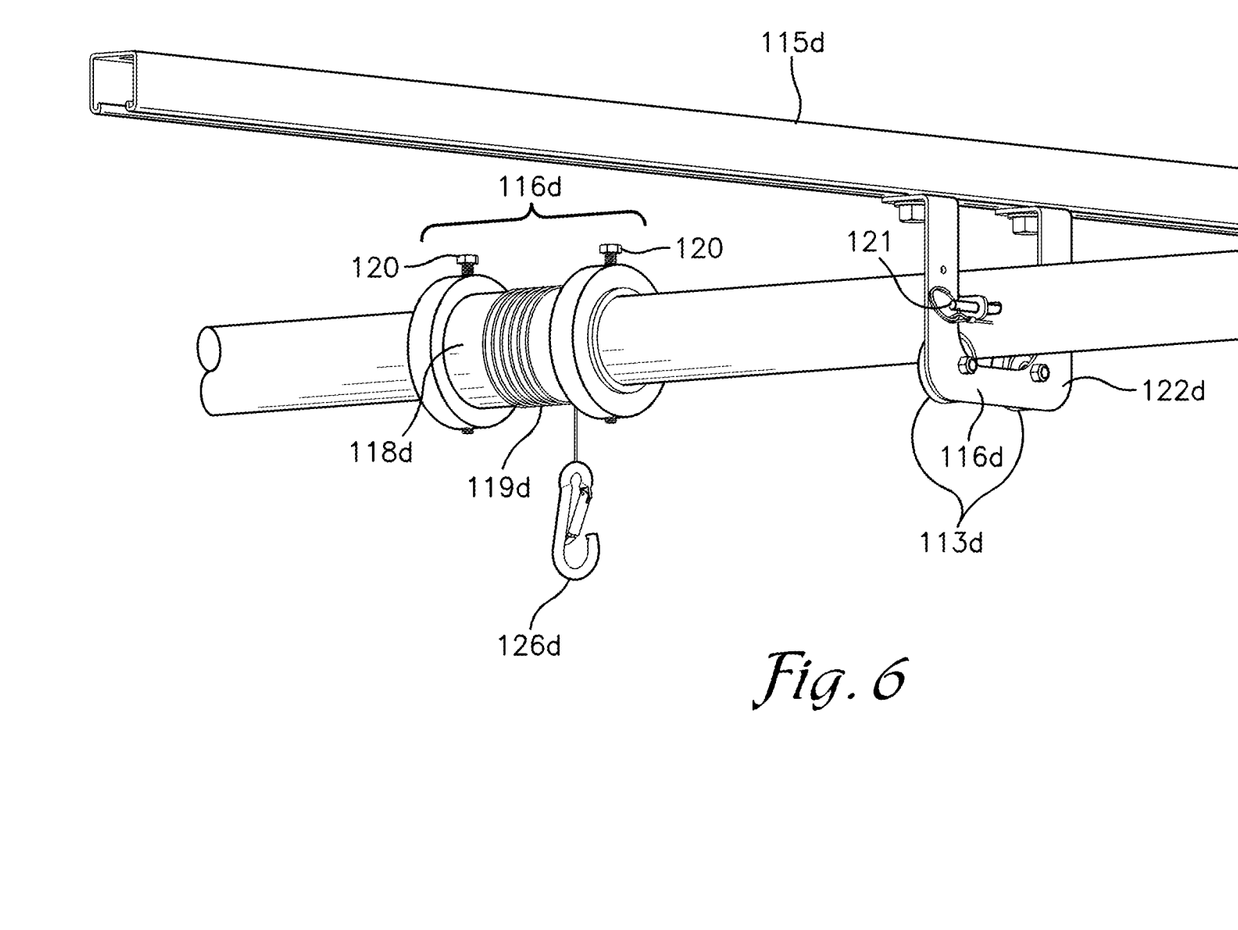
FIG. 6 is a close-up partial perspective view of a third inner portion of the motorized tubular hoist mechanism of FIG. 1.

Looking to FIGS. 4, 5, 6, the intermediate sections of the motorized tubular hoist mechanism are depicted. Each section includes an intermediate support bracket 122b,c,d, with each bracket attached to a corresponding support strut 115b,c,d that can be attached to a structural component of the indoor environmental facility. Each intermediate support bracket 122 b, c, d, includes a corresponding pair of idler wheels 113 b, c, d, that support and allow the tubular shaft 102 to turn. A corresponding cable drum 116 b, c, d is positioned on the tubular shaft 102, with lock bolts 120 securing each drum to the shaft. Corresponding cables 119 *b, c, d* are wound around each drum, with attachment hook 126 *b, c, d* attached at the end of the corresponding cable.

Figure 10:
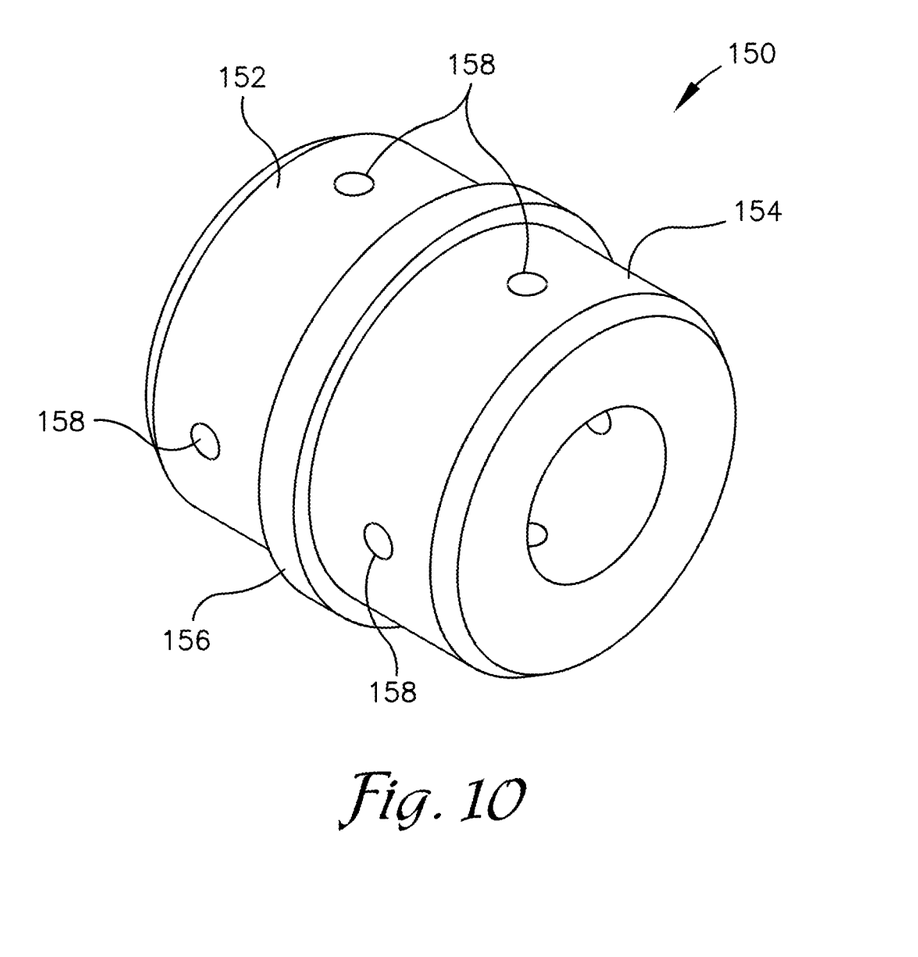
FIG. 10 is a perspective view of a coupler used to join adjacent segments of tubular shaft to allow the length of the motorized tubular hoist mechanism to be extended.

Looking to FIG. 10, a coupler 150 is used to join adjacent segments of tubular shaft 102. The coupler comprises first and second plugs 152, 154, which insert into the open ends of adjacent segments of tubular shaft 102. A raised shoulder 156 separates the first and second plugs 152, 154 and provides a seating surface for the ends of the adjoining segments of tubular shaft 102. A plurality of receptacles 158 on each plug 152, 154 receive set screws to secure the ends of the adjoined tubular shaft 102 segments in place on the coupler 150. Preferably, the receptacles 158 are threaded to receive similarly threaded set screws.

As seen in FIG. 5, two adjoining ends of segments of tubular shaft 102 are shown attached over a coupler as depicted in FIG. 10. The set screws 117 secure the ends of the shaft segments to the coupler. It should be understood that any number of segments of tubular shaft 102 may be attached to achieve any desired length. Preferably, an intermediate support bracket 122 is used under each coupler to provide support to the joined segments as depicted in FIG. 5.

Thus, with the intermediate sections of the motorized tubular hoist mechanism 100 supported by the intermediate brackets 122 *b, c, d*, and with each bracket attached to a support strut 115 *b, c, d*, rotation of the motor 108 rotates the tubular shaft 102, which in turn rotates the cable drums 116 *b, c, d*, causing cables 119 *b, c, d* to wind onto, or unwind from, the drum. With the attachment hooks 126 *b, c, d* attached to a light module or other environmental module, it can be seen that rotating the motor 108 will raise or lower that module via the cables winding or unwinding from the corresponding drums.

As shown in FIG. 6, a pin 121 may be inserted through an aperture in the intermediate support bracket 122*d* and into a corresponding hole in the tubular shaft 102. Thus inserted, pin 121 prevents rotation of the shaft 102, locking it in place. Pin 121 may be used to secure the shaft for maintenance purposes, such as when a motor must be removed or replaced, with the pin 121 maintaining the desired positions of attached environmental modules during such service times.

Support struts 115 may be any type of tubular square struts known in the art, for example a Unistrut or similar type strut. In alternative embodiments, the motor, idler, and intermediate support brackets can be attached directly to support structures within a facility, or may be attached to other types of support struts.

Figure 7:
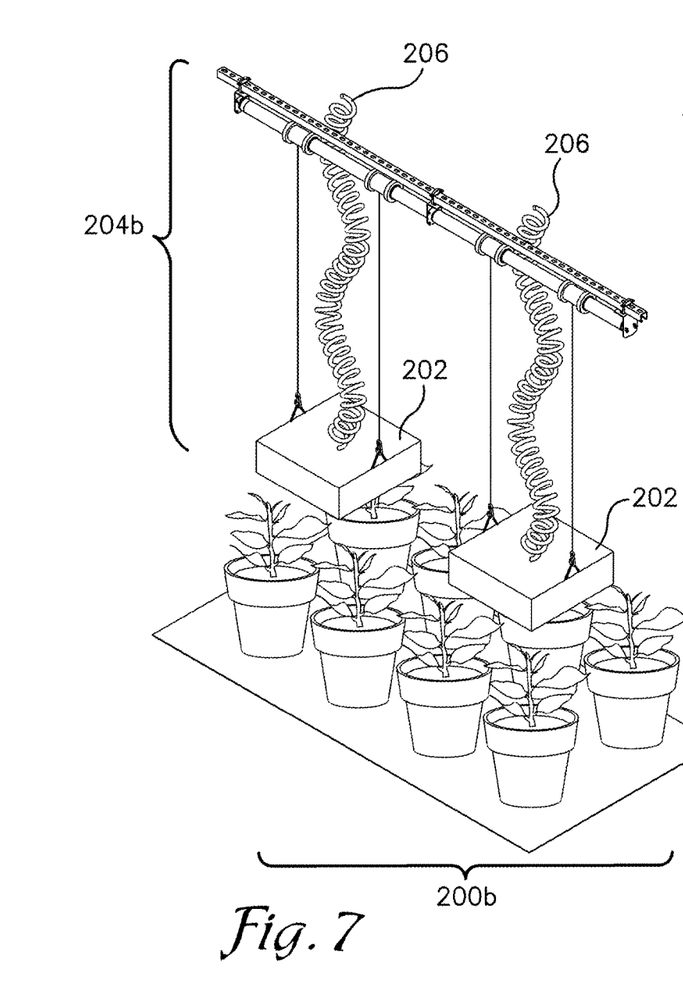
FIG. 7 is a perspective environmental view of first motorized tubular hoist mechanisms in use with lighting modules in an indoor environmental facility in accordance with an exemplary embodiment of the present invention.
Figure 8:
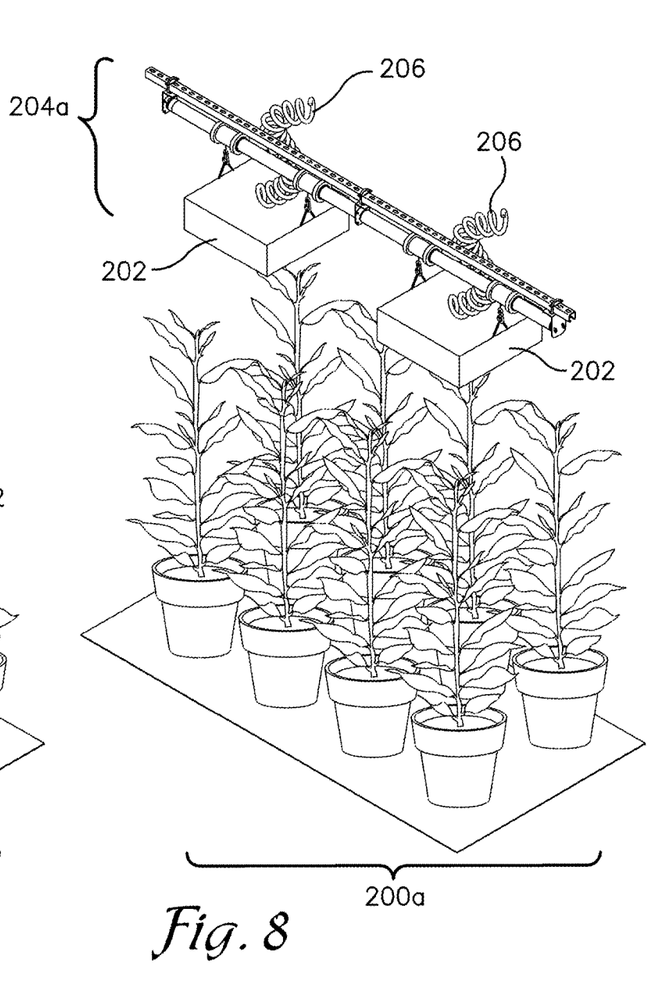
FIG. 8 is a perspective environmental view of a second motorized tubular hoist mechanism in use with lighting modules in an indoor environmental facility.

Looking to FIGS. 7 and 8, in an exemplary embodiment of the present invention, a pair of motorized tubular hoist mechanisms as just described are shown in use with first and second groups of plants 200*a*, 200*b*. As seen in the figures, light modules 202 are attached to the attachment hooks of the motorized tubular hoist mechanisms as described above. A coiled power cord 206 extends from each light module 202 and connects to an appropriate power source, such as an AC power mains or other power supply. As can be seen in the figures, the coiled power cords 206 extend and retract as the light modules are raised and lowered such that the cords 206 are kept out of the way of the plants and light modules. In alternative embodiments, additional wires or cables may be similarly placed, for example ethernet or other communication wiring may be routed to each module to allow communication to and from the light modules and/or other sensors located on the modules.

As seen in FIG. 7, in use with a taller group of plants, the height of the light modules is adjusted to be in proximity to the uppermost portions of the plants. As described above, raising and lowering of the modules is accomplished by commanding the motor of the tubular hoist mechanism to rotate, which rotates the shaft and attached cable drums. The cable is wound, or unwound, from the drum to raise or lower the attached light modules 202.

Looking still to FIGS. 7 and 8, positioning of the lights in this manner allows more efficient distribution of light energy to the plants as opposed to a fixed light mounted, for example, high above the plants on the ceiling of a facility. As seen in FIG. 8, with a shorter group of plants, the height of the light modules can be adjusted to be in proximity to the tops of those plants. As described above, this is accomplished by rotating the motor of the hoist assembly to raise and lower the lighting modules. Thus, the height of the lighting modules, and/or the distance of the lighting modules above the uppermost portion of the plants can be adjusted to optimize the placement of the lighting modules. Similarly, in alternative embodiments, other environmental modules may be attached, having, for example, environmental sensors that obtain information from the facility and/or the plants.

Commands to the motors of the motorized tubular hoist mechanism is preferably through radio frequency control from a central controller as will be described in more detail below. Likewise, communication to and from the light modules and sensor modules is preferably through a wireless connection, although in alternative embodiments the modules and the motors may be hardwired to a controller.

Looking back to FIGS. 2 though 6, it can be seen that the orientation of the support struts 115 *a, b, c, d, e* can allow the position of the motorized tubular hoist mechanism to be adjusted by sliding the motor, idler, and intermediate support brackets simultaneously within their corresponding support struts. Thus, for example, a single hoist mechanism may be moved from one side of a room to another, or adjusted to place the light modules in a desired position above a group of plants.

It should be understood that the motorized tubular hoist mechanism as just described may equally be used to support other types of modules in addition to light modules. For example, the mechanism may be used with watering, oxygenation, filtering, or other environmental modules known in the art. In addition, the mechanism may be used with sensor modules operable to collect environmental data from the facility and/or from the plants. These various modules may be used individually or in groups as required for a particular application.

Preferably, the motor includes logic and control circuitry that allows it to receive a command signal from an external source, and to move to a commanded position. In some embodiments, the motor includes an encoder that provides a precise position of the motor, with the logic and control circuitry operable to transmit that position to an external controller or computer. Most preferably, the motor further included communication circuitry that allows it to receive commands and other data wirelessly from a remote controller or computer, and to transmit position and other data to that remote controller or computer.

In a further embodiment, a system for controlling one or more motorized tubular hoist mechanism as just described includes a plurality of environmental sensors operable to collect data parameters corresponding to conditions of the facility and conditions of the plants within the facility, and to command the logic and control circuitry of the motors of the tubular hoist mechanisms to adjust the positions of various environmental modules based on that collected data as will now be described.

Figure 9:
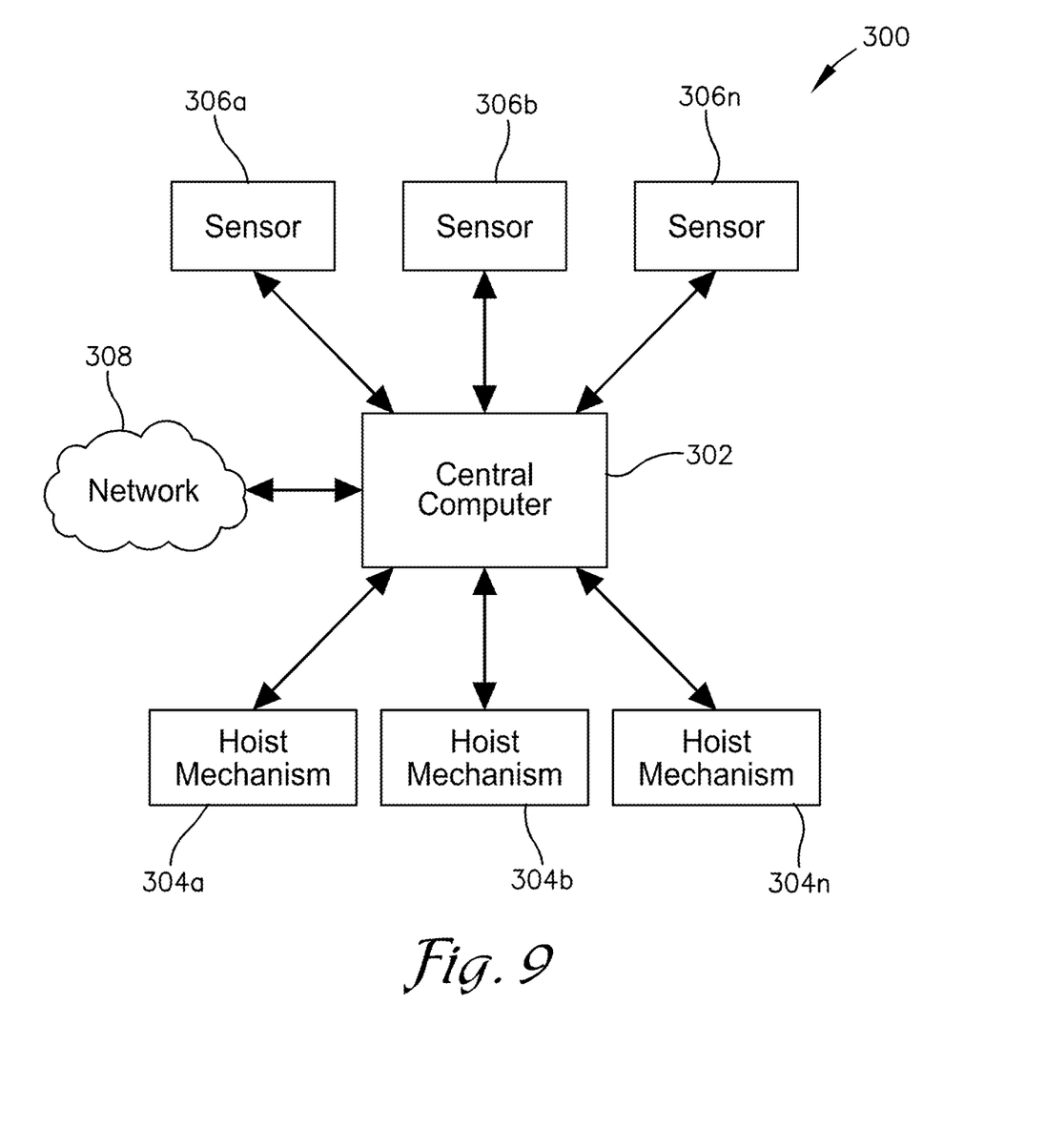
FIG. 9 is a block diagram of a computer system used in controlling a plurality of motorized tubular hoist mechanisms in accordance with an exemplary embodiment of the present invention.

Looking to FIG. 9, a management system for closed environmental facilities in accordance with an exemplary embodiment of the present invention is depicted generally by the numeral 300. The management system 300 includes a plurality of environmental sensors, 306a, 306b, 306n in communication with a central computer 302. The central computer is further in communication with a plurality of motorized tubular hoist mechanisms 304a, 304b, 304n, as described above, and with a network 308 to allow communication with other management systems. Central computer 302 preferably includes a memory device and a database to store instructions for execution by a processor, and to store data, commands, and other information related to the environmental management system.

Communication between the central computer 302 and the environmental sensors 306a, 306b, 306n and the motorized tubular hoist mechanisms 304a, 304b, 304n is preferably via wireless network communication, such as WiFi, although any wireless radio frequency, light, or wired connection using any known protocol may be employed.

Environmental sensors 306a, 306b, 306n may be any environmental sensor known in the art, such as moisture sensors, oxygen sensors, $CO_2$ sensors, humidity sensors, and the like. The environmental sensors may be used in groups of like sensors, groups of mixed sensors, or any desired arrangement. For example, in a particular application a user may want to measure the moisture levels in soil for a group of plants and the oxygen level in the air of the facility. It should be understood that the sensors may be placed within the facility, directly at the plants, or may be placed on or in modules supported over the plants by the motorized tubular hoist mechanisms as previously described.

The hoist mechanisms 304a, 304b, 304n, are as those previously described, supporting any type of environmental modules as desired or required by a particular application. For example, the hoist mechanisms may support lighting modules, watering modules, or may support sensor modules to measure parameters of the facility or plants, or combinations of such modules and sensors.

Looking still to FIG. 9, in an exemplary operation, the central computer or controller 302 has programmed information as to desired parameters for optimal growth of the plants with which the system is being used. For example, the central computer 302 may have a desired lighting intensity and wavelength, and a desired height of a lighting module above the plant to achieve that intensity and wavelength. Based on input from the environmental sensors 306a, 306b, 306n, the computer may calculate that the lighting intensity is below the desired level, and thus the lighting module must be lowered. The computer then sends a command to the appropriate hoist mechanism 304a, 304b, 304n, to command the hoist to raise or lower the lighting module to achieve the desired intensity. It should be apparent that the central computer may likewise make similar calculations and adjustments with respect to any number of such sensors and hoist mechanisms, and thus automatically control the hoist mechanisms to achieve the desired results.

In further embodiments, the central computer may be in communication over a wide area network, such as the Internet, to allow users to remotely monitor parameters and to remotely control the hoist mechanisms. These and other embodiments are within the scope of the present invention.

From the above, it can be seen that the management system for closed environmental facilities and motorized tubular hoist mechanism of the present invention can be employed to provide automated and semi-automated control of environmental parameters in a closed environmental system.

While the motorized tubular hoist mechanism and management system for closed environmental facilities of the present invention have been described herein with respect to specific embodiments, many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A tubular motorized hoist mechanism, comprising:
   an elongated tubular shaft extending between first and second ends;
   a motor attached to the first end of the tubular shaft;
   an idler mechanism attached to the second end of the tubular shaft; and
   a cable drum attached around the tubular shaft such that rotation of the motor rotates the tubular shaft and cable drum to wind and unwind cable from the cable drum; wherein the cable drum comprises a locking bolt to secure the cable drum in a desired position along the tubular shaft; wherein the cable drum comprises a plurality of cable drums positioned along the tubular shaft; wherein the plurality of cable drums can move relative to each other.

2. The tubular motorized hoist mechanism of claim 1, wherein:
   the motor comprises logic and control circuitry operable to actuate the motor and to communicate over a communications link to receive commands from a central controller indicative of a desired operation of the motor.

3. The tubular motorized hoist mechanism of claim 1, further comprising:
   a cable attached at a first end to the cable drum; and
   an attachment hook attached to a second end of the cable.

4. The tubular motorized hoist mechanism of claim 1, further comprising:
   a plurality of support brackets to support the motor, idler mechanism, and tubular shaft.

5. The tubular motorized hoist mechanism of claim 1, further comprising:
   a coupler configured to insert into adjoining segments of the tubular shaft to allow extension of the shaft to a desired length.

6. A management system for closed environmental facilities, comprising:
   one or more tubular motorized hoist mechanisms of claim 1;
   one or more environmental modules attached to the one or more tubular motorized hoist mechanisms such that operating the motor of the tubular motorized hoist mechanism raises or lowers the attached one or more environmental modules.

7. The management system for closed environmental facilities of claim 6, wherein:
the motors of the tubular motorized hoist mechanisms comprise logic and control circuitry operable to actuate the corresponding motor and to communicate over a communications link to receive commands from a central controller indicative of a desired operation of the motor.

8. The management system for closed environmental facilities of claim 7, further comprising:
wheren the controller comprises a central computer in communication with the logic and control circuitry of the motors.

9. The management system for a closed environmental facility of claim 8, further comprising:
a database in communication with the central computer to store executable commands and collected environmental data.

10. A management system for closed environmental facilities, comprising:
one or more tubular motorized hoist mechanisms of claim 1;
one or more environmental sensors;
one or more environmental modules attached to the one or more tubular motorized hoist mechanisms such that operating the motor of the tubular motorized hoist mechanism raises or lowers the attached one or more environmental modules; and
a central computer comprising a processor and a database having executable instructions, that when executed by the processor cause the system to:
obtain data from the one or more environmental sensors;
determine a desired position an environmental module;
command a motor of a tubular motorized hoist mechanism to rotate to move the environmental module to the desired position.

11. The management system for closed environmental facilities of claim 10, wherein:
the motors of the tubular motorized hoist mechanisms comprise logic and control circuitry operable to actuate the corresponding motor and to communicate over a communications link to receive commands from the central controller indicative of a desired operation of the motor.

* * * * *